(12) United States Patent
Barker

(10) Patent No.: X925
(45) Date of Patent: Aug. 26, 1808

(54) HYDRAULIC MACHINE/WATER ELEVATOR

(76) Inventor: William Barker

William Barker
Letters Patent dated 25th August 1808
The schedule referred to in these Letters Patent
& making part of the same containing a Descrip:
tion in the words of the said William Barker him:
self of his Machine for raising Water This Machine consists in a Spiral Wheel
on an horizontal Axis, on one end of which are
one two or more cranks, to which are attached rods
connected with & working the Pistons of the forcing
Pumps which are placed in an horizontal & parallel
position and communicating with a Chamber by means
of a valve in each near their insertion in the Cham:
ber, The head of the Pistons are furnished with a
valve to admit the water into the pumps, as it
is drawn back closing as the water is driven
for_ The whole is supported by a suitable frame
and sunk into the water where _ [illegible] is [illegible] & rapid
the axle of the wheel laying in the direction of the
stream additional power may be given the Machine
by making use of a wing dam an endless chain
or a rope may be passed round the Axis of the
spiral wheel & a band wheel attached to any ma:
chinery on shore Water may by this Machine be
raised to heights for irrigation for working Machinery
supplying a town with water, & for a variety of
other useful purposes.

Witnesses { Jack Clift
Geo M Holtenback

William Barker
[illegible]

Received & recorded a new 11 Decr 1851